United States Patent [19]

Pereda

[11] 4,004,781

[45] Jan. 25, 1977

[54] ARRANGEMENT FOR THE MANAGEMENT OF PASTURES ALONG LAND STRIPS LIMITED BY WIRE FENCES

[76] Inventor: Fernando Ramon Pereda, Dr Luis Agote 2455, Buenos Aires, Argentina

[22] Filed: Sept. 26, 1975

[21] Appl. No.: 617,259

[52] U.S. Cl. .................................................. 256/10
[51] Int. Cl.² ........................................... A01K 3/00
[58] Field of Search ................................ 256/10

[56] References Cited
UNITED STATES PATENTS

| | | | |
|---|---|---|---|
| 2,690,898 | 10/1954 | Melcher | 256/10 |
| 2,691,359 | 10/1954 | Arstiss et al. | 256/10 |
| 3,112,731 | 12/1963 | Lako et al. | 256/10 |

Primary Examiner—Werner H. Schroeder
Assistant Examiner—Doris L. Troutman
Attorney, Agent, or Firm—Pollock, Vande Sande & Priddy

[57] ABSTRACT

An arrangement for rotational grazing of pastures along land strips defined by parallel guide wires. A wire perpendicular to the parallel guide wires is slidably coupled to the latter so as to be readily moveable when a new strip of pasture is to be used. The moveable wire is coupled to a parallel conductive wire connected to a voltage source.

3 Claims, 5 Drawing Figures

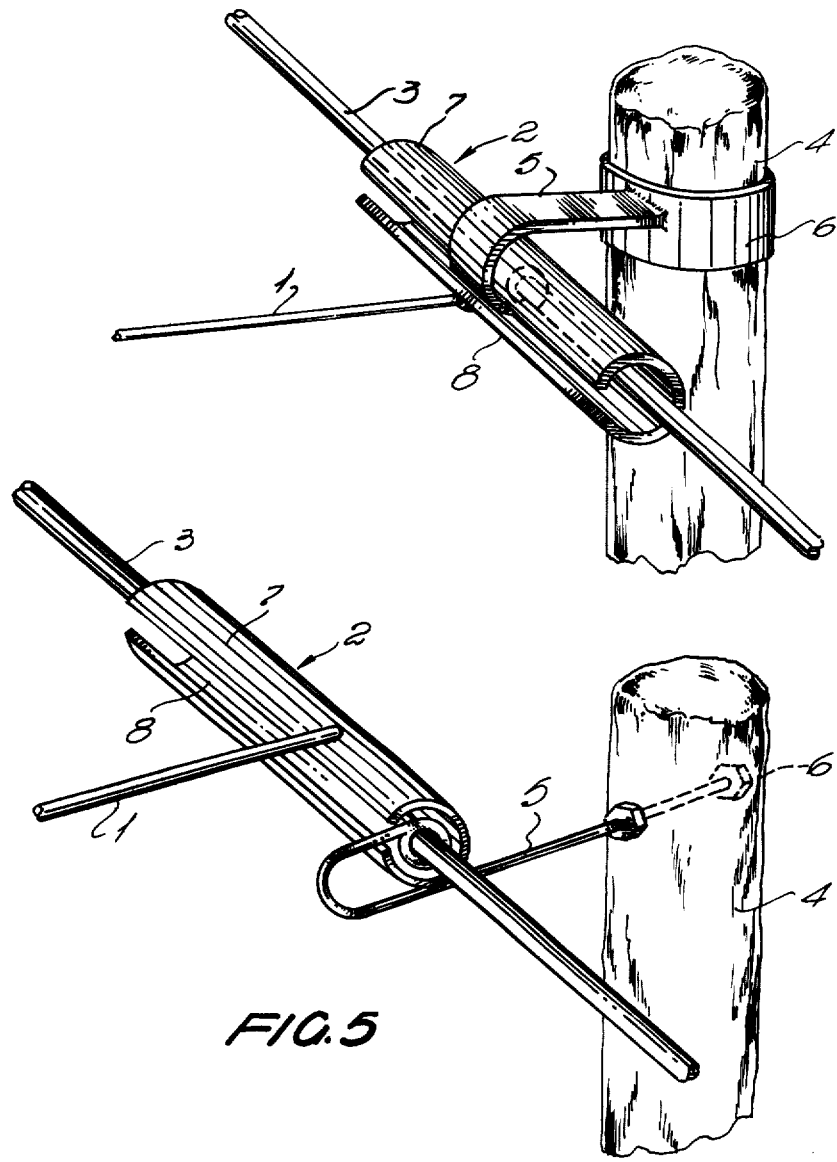

ARRANGEMENT FOR THE MANAGEMENT OF PASTURES ALONG LAND STRIPS LIMITED BY WIRE FENCES

The present invention relates to an arrangement for grazing management, and its main object is to provide a wire enclosure having elements capable of being displaced and connected with an electric source, so that changes in the use of grazing lots can easily be carried out.

This well known that rotational grazing can improve enormously the fertility of grazing land, especially its natural flora.

In raising an animal, to prevent its being a threat to the improvement of the pasture feeding it, it is desirable that land-use time be minimal. However, division of the land into lots to be used for predetermined grazing periods presents problems, because it requires a large number of crossing fences, with the necessary communications susceptible of interruption, resulting in high installation and maintenance costs.

To overcome this problem, the present invention provides an assembly which essentially consists of a wire made of metal or any material resistant to stresses, extended between two guiding wires rigidly mounted on corresponding posts limiting the land strip designed to be managed with rotational grazing. The first mentioned wire passes through a longitudinal perforation formed in a dragging member provided with at least one disc rotatable around an axis mating with the perforation and further provided with a longitudinal piece, resiliently mounted thereon and radially upwardly extended in the end of this piece a conductive wire is supported, so that it is maintained parallelly and at a predetermined distance above said first wire.

The conductive wire is slidably coupled to a conductor arranged in parallel relation to the guiding wires. If desired, one of said guiding wires may simultaneously be a conductor connected to a high voltage source. The dragging member, provided with at least one wheel, has mounted thereon a bearing element on the land, such that the longitudinal piece is inclined with respect to the metal wire, permitting an animal, to push it, advancing it without touching the conductive wire. If this were not done, the animal attempting to pass over would receive a shock effected from the charged conductive wire.

In order that this invention may be more clearly understood, it has been represented in its preferred embodiment in the accompanying drawings, wherein:

FIG. 4 is a perspective view of one of the embodiments for mounting the guiding wires and the conductor, and FIG. 5 shows, also in perspective, an arrangement for coupling the metal or stress-resistant material wire and the conductive wire with the guiding wires and the conductor.

Figure 1:
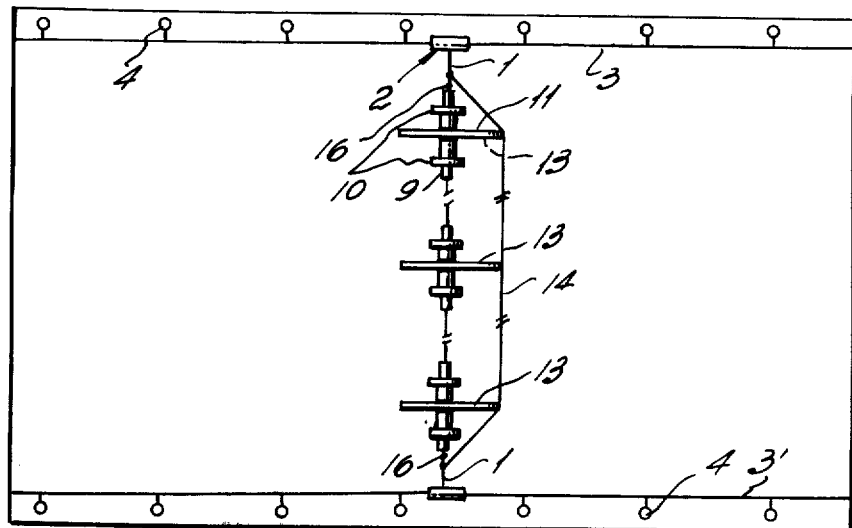
FIG. 1 is a plan view of the arrangement of the invention, showing the location of its components in a strip of land.

In all figures the same reference indicates the same or corresponding parts of the arrangement of the invention, which comprises a wire 1 of stress-resistant material, the extremes of which are secured by means of a slidable coupling 2 to a guiding wire 3 extending between posts 4 separated by a distance such that horizontal positioning of the guiding wire is assured.

There are many ways for attaching guiding wires 3 to posts 4, as well as each end of the wire 1 to said guiding wires, in order that the former can slide in respect to the latter without obstacles. As a possibility of embodiment which does not form a part of the invention, the guiding wires 3 can be held by hooks 5 attached to posts 4 by conventional means, such as by welding to a surrounding collar 6 (FIG. 4) or by the use of clamping nuts 6' (FIG. 5). The end of wire 1 is tied to a tubular element 7 which is inserted on the guiding wire through a notch 8 which permits the insert of the body of hook 5. Obviously, the tubular element 7 can be replaced by any equivalent means, e.g., by a pulley slidable on guiding wire 3 and attached by means of a hook to the relative end of wire 1.

The wire 1 passes through at least one tubular member 9, on which is freely turnably mounted at least one disc 10 the diameter of which is selected so it can bear on the land when wire 1 is in horizontal position between the guiding wires 3. The tubular member 9 may have two discs 10 to facilitate its displacement, as can be seen in the drawings, but the arrangement can operate with only one disc, in which case it is necessary to provide a larger number of tubular members to diminish the catenary sagging of wire 1 between same so as to maintain the latter in straight and horizontal position.

Figure 2:
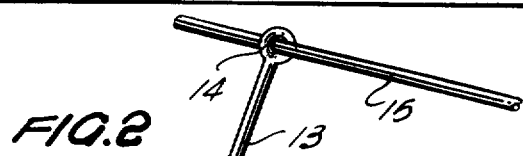
FIG. 2 is a detailed view of the bearing member for the displaceable wires.

On land of tubular body or member 9 there is disposed a supporting member 11 and there is secured one end of a resilient member, which in the embodiment shown in FIG. 2 is a helical spring 12.

To the other end of the resilient member there is attached one end of a rod 13, the other end of which has an eyelet 14 for the passage of a conductive wire 15, the ends of which are slidably mounted and in electrical contact with a conductive wire insulatedly mounted on the posts 4, over the guiding wires 3. In the alternative illustrated in FIG. 1, the wire 1, near the guiding wires 3, can carry an insulator 16, the electrified wire 15 being linked with the portion of 1 comprised between insulator 16 and guiding wire 3, which in turn may be the electrical conductor and can be connected to a high voltage source.

Figure 3:
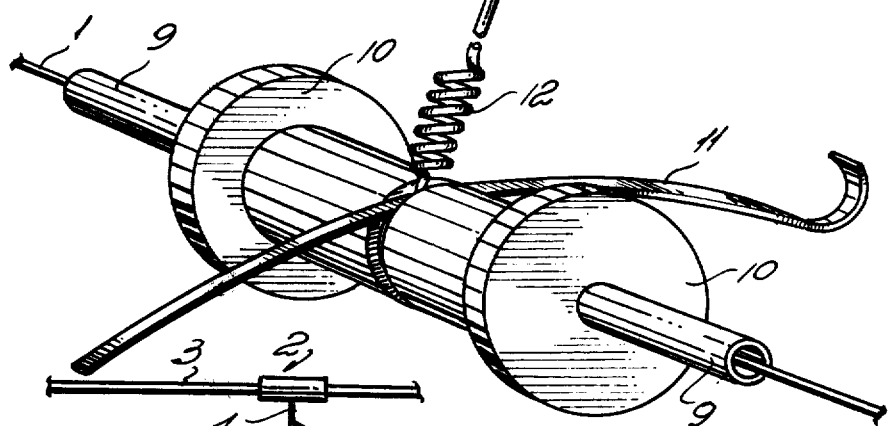
FIG. 3 is an elevation of what is shown in FIG. 2.
Figure 3:
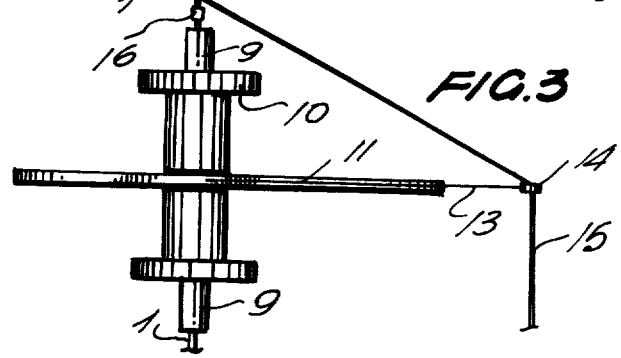

The supporting member 11 is of such a configuration that when maintaning contact with the land permits rod 13 to be inclined forwrdly with respect to the vertical passing tubular member 9, as shown in FIG. 3.

The conductive wire 3 is connected to a high voltage source of the type used for electrifying fences.

According to the arrangement of the invention wires 3 and 3' define a grazing strip, the initial utilization extreme of which is determined by the initial position given to wire 1. The area to be available for grazing is, at the outset defined by guiding wires 3 and 3' and wire 1 in such a manner that, if an animal tries to advance toward a new grazing area, its head will abut the electrified wire 15, resulting in a shock. However, resilient element 12 will allow a sufficient displacement of wire 15 so that the animal does not suffer any damage. Once the area limited as indicated is exhausted, the slidable couplings 2 can be moved so that they, together with wires 1 and 15, are forwardly displaced, defining a new grazing area. This can occur either through displacement by the required personnel or by the thrust of the animals themselves on wire 1, with tubular members 9 and/or discs 10.

I claim:

1. An arrangement for rotational grazing of pastures along land strips defined by wire fences, comprising
   a. a body having a passage for a wire;
   b. a wire extending through said passage;
   c. at least one disc-shaped member on said body, the axis of said disc-shaped member being coaxial with said passage;
   d. a plurality of guiding wires defining boundaries of said land strips;
   e. means for linking the ends of said first-mentioned wire with said guiding wires;
   f. a supporting member on said body;
   g. a resilient member having one of its ends attached to said supporting member;
   h. a conductive wire parallel to said first-mentioned wire and slidably coupled to said resilient member;
   i. said conductive wire being provided at its ends with slidable attachment means having respective conductors extended on said guiding wires and connected to a voltage source.

2. An arrangement as defined in claim 1, wherein said resilient means is coupled to said conductive wire by means of a rod with an end having an eyelet, said conductive wire passing through said eyelet.

3. An arrangement as defined in claim 2, wherein said supporting member is positioned in a groove in said body, said rod being inclined forwardly with respect to the vertical passing through said body, said resilient means permitting a predetermined amount of diaplacement of said conductive wire.

* * * * *